United States Patent
Sauder

(10) Patent No.: US 6,269,758 B1
(45) Date of Patent: Aug. 7, 2001

(54) SEED SELECTION MECHANISM

(76) Inventor: Gregg A. Sauder, 23207 Townline Rd., Tremont, IL (US) 61568

( * ) Notice: Subject to any disclaimer, the term of this patent is extended or adjusted under 35 U.S.C. 154(b) by 0 days.

(21) Appl. No.: 09/644,447

(22) Filed: Aug. 23, 2000

(51) Int. Cl.$^7$ .............................. A01C 7/18; A01C 7/20
(52) U.S. Cl. .......................................... 111/177; 221/211
(58) Field of Search .......................... 221/211; 111/183, 111/184, 185, 177, 170

(56) References Cited

U.S. PATENT DOCUMENTS

| | | | |
|---|---|---|---|
| 4,688,698 | * | 8/1987 | Holland ................................ 221/211 |
| 5,115,992 | * | 5/1992 | Nugent ................................. 241/236 |
| 5,615,553 | * | 4/1997 | Lourigan ............................... 60/422 |

* cited by examiner

Primary Examiner—Christopher J. Novosad
(74) Attorney, Agent, or Firm—Rockey, Milnamow & Katz, Ltd.

(57) ABSTRACT

The invention comprises an improvement for finger type seed meters. The improvement is a backing or wear plate of lubricious material with a seed release and an exit. The improved also has a cutout section and a plurality of variable inserts to get accurate seed spacing of a variety of size and shapes of seeds. Each insert of the meter includes a seed release area having varied shapes and depths of projections and depressions to accomplish accurate and timely release from the fingers of seeds of various sizes and shapes. Each insert also has an improved seed exit or void. The exit void being varied both in dimension and contour to substantially eliminate seed rejections and to ensure seed ejection into a seed tube and thence to the soil.

16 Claims, 8 Drawing Sheets

| FIG. 3A | FIG. 3B |

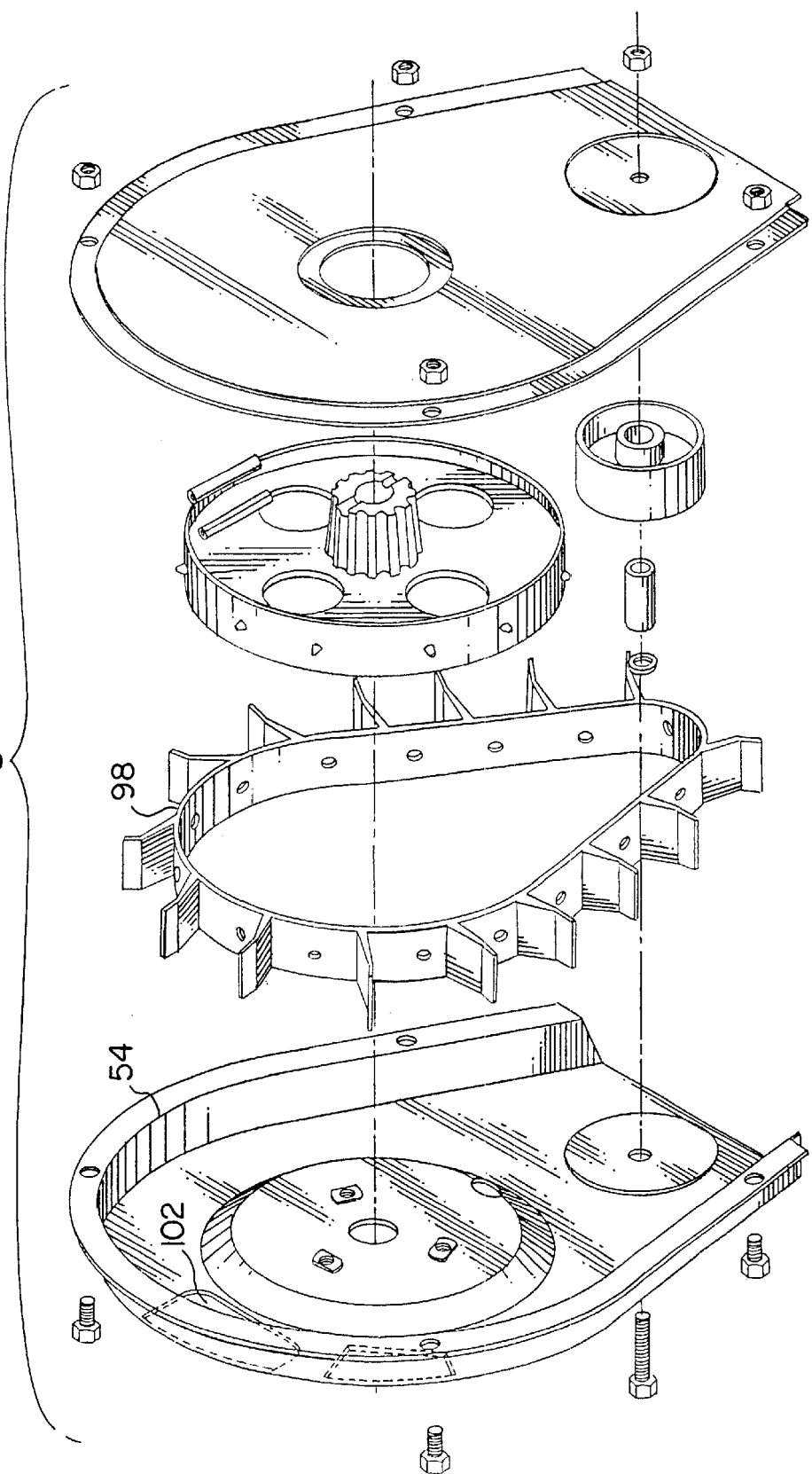

SEED SELECTION MECHANISM

BACKGROUND AND BRIEF SUMMARY OF THE INVENTION

When planting corn and other row crops it is essential to place the seeds in the ground with uniform spacing between the seeds to ensure an even growth and maximum crop yield. Most row crops are now planted individually and are not in hills as prior planting practice as learned from the Indians.

After hill planting the next improvement to improve yield was a seed selecting mechanism known as the plate type planter wherein a seed plate rotates beneath the supply of seed, the seeds drop into a recess of predetermined size in the plate relative to the seed to be planted. This seed was then carried by the plate to a slot hole for ejection by gravity. A separate plate was necessary for each seed size i.e., bean, corn, cotton etc., the seeds also had to be of uniform size requiring grading of the seeds.

With the advert single cross hybrids the problem of grading became extremely difficult due to the irregular size as compared to the regularity of double cross seeds.

The plateless planter invented by Keeton and disclosed in U.S. Pat. No. 3,308,774 issued Mar. 4, 1967 operated on an entirely different principal from the plate planter. The seeds in the finger pick up meter are engaged by fingers and slid along a vertical circular plate until they are ejected through a hole in the plate.

This planting device was improved as disclosed in U.S. Pat. No. 3,552,607 wherein the seed engaging member was divided into a large and small seed engaging part also, an improved seed remover consisting of depressed areas or modulations including sloping surfaces was added just prior to the exit.

The vertical circular plate required a very flat surface in the area of circumference contacted by the fingers holding the seed. This portion of the plate was reinforced and machined for a flat surface was also necessarily wear resistant to the pressure of the seeds in the fingers.

This additional wear plate has been abandoned in favor of a stamped plate of hard metal. This stamped plate does not provide a flat uniform surface for transportive the seed by the fingers and the removing means or the depressed area is also not true. This metal vertical plate is also subject to change in surface flatness due to wear and the variations due to stamping.

The spacing of seeds within the row will be varied by the row width to be planted.

Before the advert of accurate meter calibration, a farmer would calibrate, as best as he could, the meter for row and seed spacing and speed of the planter to obtain maximum yield. However, this calibration has been found to be subject to accuracy with only one size shape of seeds. The requirement to use different seed size and shape occurs because of each farmers demand for more seed than can be furnished to him from one seed company in one size and shape. This farmer also may desire seed with certain genetics for different soils and these seeds then may be different sizes and shapes from the calibrated seeds.

The seed size and shapes vary and for accurate performance the release means is different for flats, rounds, large and small combinations of seeds. Thus by changing seeds and not recalibrating and not changing the release means, proper seed spacing will be forfeited.

Tests on current state of the art meter calibration devices such as the MeterMax™ can determine the speed modulation or depression release and tension of the fingers for maximum planting accuracy for each type of seed. The tension on the fingers and the modulation have not been variable in planters previously. This invention provides for variation in the depression or modulations of the seed release area without removing the meter from the planter and still maintaining a flat even wear resistant surface of the backing plate.

The exit slot has also been changed to avoid rejection of seeds back into the meter from the seed conveyor as determined by calibration of the meter. This improvement is provided by reducing the size of the exit slot and also changing the shape or contour of the exit slot.

For example, a grower may have three different seed sizes, total of 90 bags of corn seeds, he may have 30 bags of great big rounds, 30 bags of medium size flats and 30 bags of a real small diamond shape seed. This mix has occurred because there is only so much seed available in various sizes and he gets what is available from his supplier or by choice. Thus the grower will have set by calibration his planter with a metering device to have top performance in one size only with current finger planters. If you set your planter with a calibration device so that it is accurate for one seed with the normal backing plate, one-third of the seeds would be spaced accurately and two-thirds of the seeds would not be accurate as to spacing between the seeds. Thus two-thirds would not be getting the maximum yield potential because of skips and/or doubles. There are two different backing plates available in the stamped metal in the industry at the current time. The farmers is locked into that for the whole year because to change planting accuracy would have to change meters i.e., take the meter off and dissemble the components in order to change the backing plates. During the season it is an impossible task because of the time and expense required.

This would require taking apart the row units and putting in a new backing plate and then would not know where to set without going back to a meter adjustment station. Under current conditions it would take up to two days to get your unit changed for a different seed size with the current backing plates thus the farmer must accept less than optimum performance for two-thirds or some percentage of his seeds. This invention permits the finger pickup type planter to compete with vacuum planters where they merely stop and change the disk. This currently requires stopping and removing the planter and meter to change the insert to ensure maximum performance. This fine tuning of the specific seed style has only recently been possible because of the introduction of seed performance equipment. The current test stands let a technician adjust a finger pickup type meter for peak performance with one type seed. This invention, one may adjust for at least three or more specific type seed performance which may be changed as the seed is changed.

This provides a perfectly flat running surface for the finger to run on, no warping in the backing plate and the fingers will run with no variance of pressure and will then drop seed correctly into the outlet. In this case the modulations are changed but are not radically different in each case. However the modulations are different for each different type of seeds.

Since the introduction of test stands capable of monitoring the performance of the meters it has been possible to get detailed testing of the performance of the meters preseason. In this testing it was found that the outlet currently used is too large. This requires a change in the outlet form and size. This will prevent the ricocheting of seeds back for the transfer mechanism in the discharge outlet. This increased the number of skips from the meter by the fact that the outlet was not properly sized or shaped.

These and other objects advantages this invention will be apparent to those skilled in the art after consideration of the following detailed description taken in conjunction with the accompanying drawings in which a preferred form of this invention is illustrated.

DESCRIPTION OF THE PREFERRED EMBODIMENTS

Figure 1:
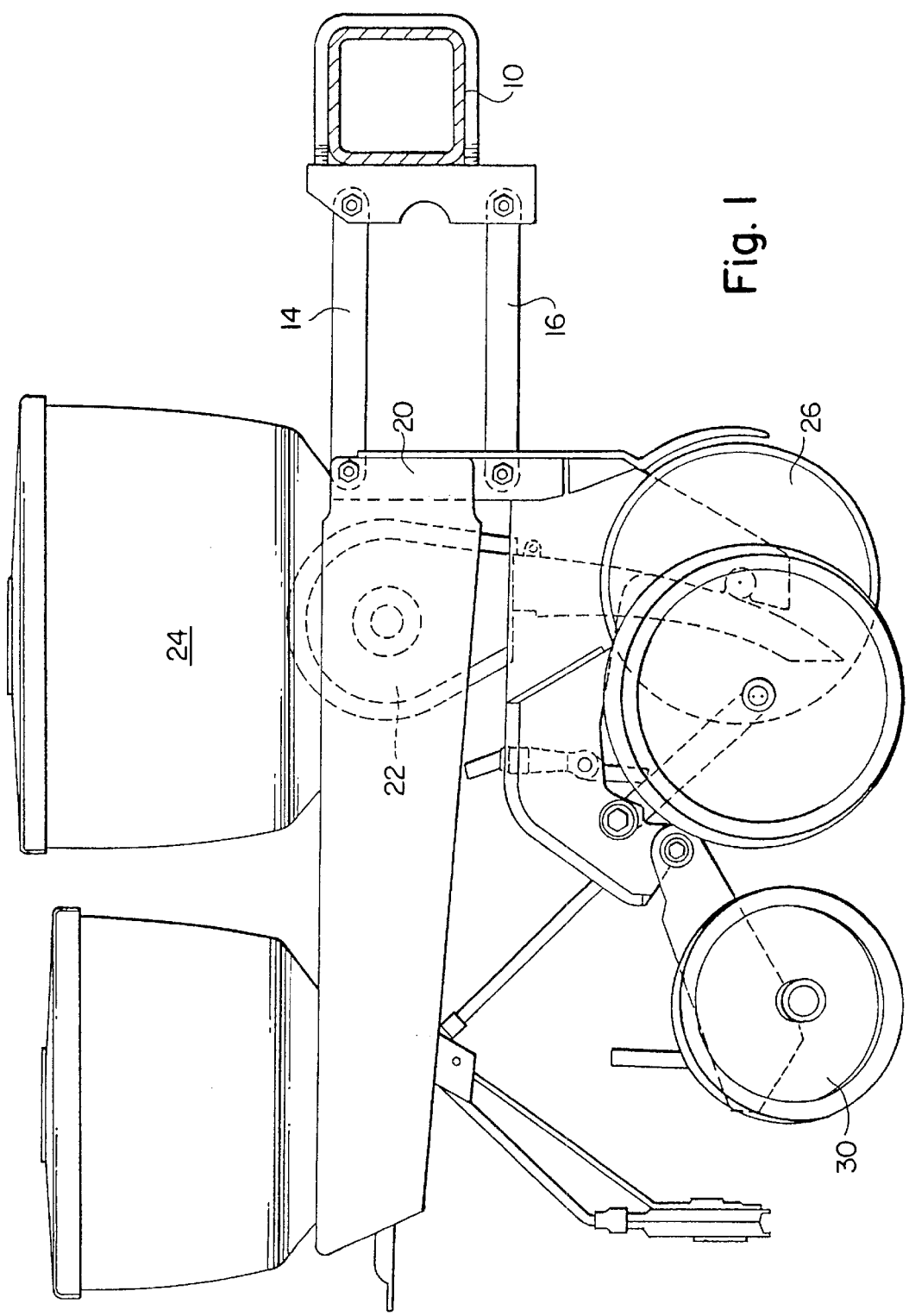
FIG. 1 is a perspective view of a portion of a planter in which the principals of the present invention are incorporated.
Figure 2:
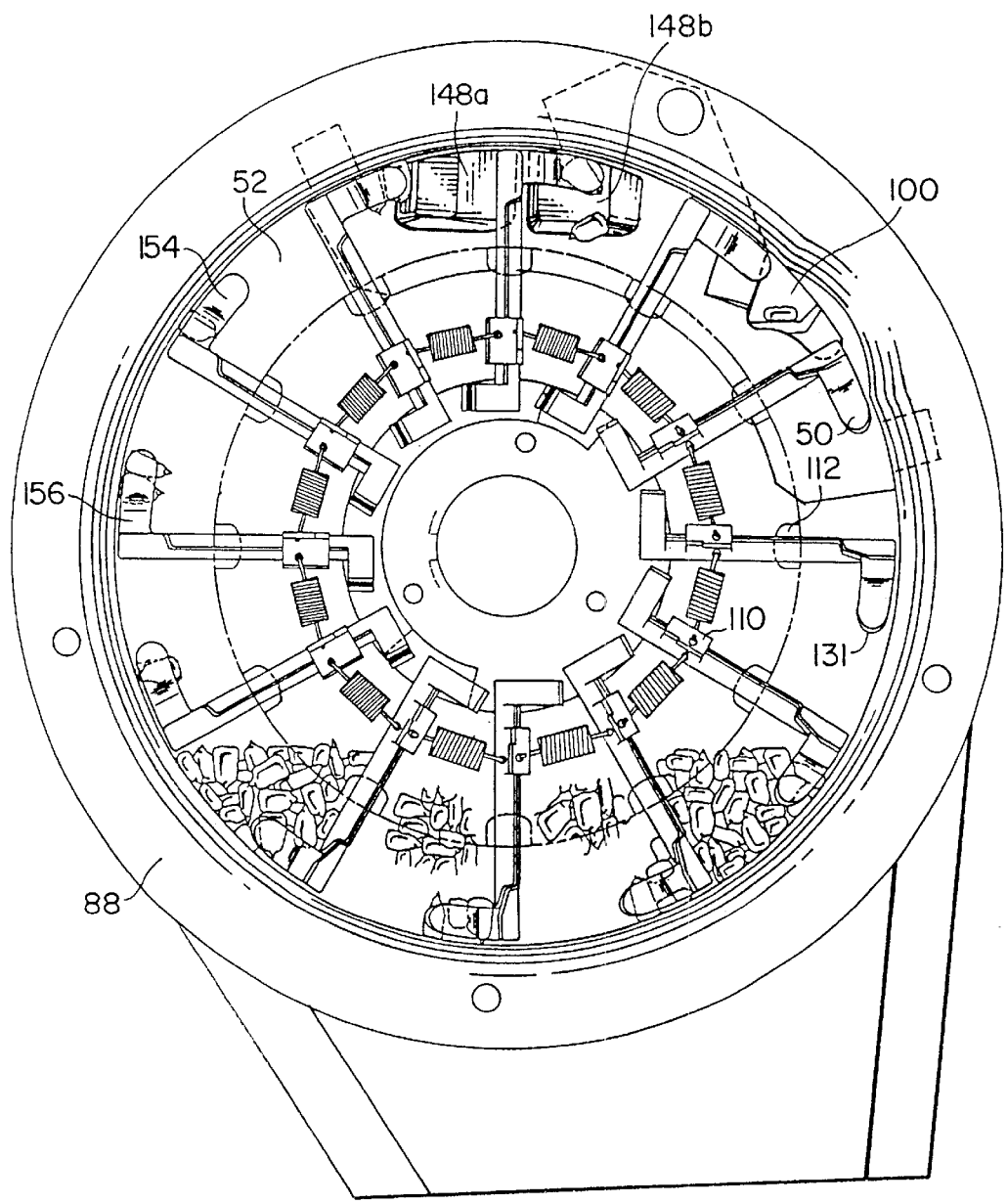
FIG. 2 is a perspective view of that portion of the seed selecting mechanism which includes a plurality of seed selecting fingers, a seed selecting finger holder and the plate with which the seed selecting fingers cooperate.
Figures 3, 3A:
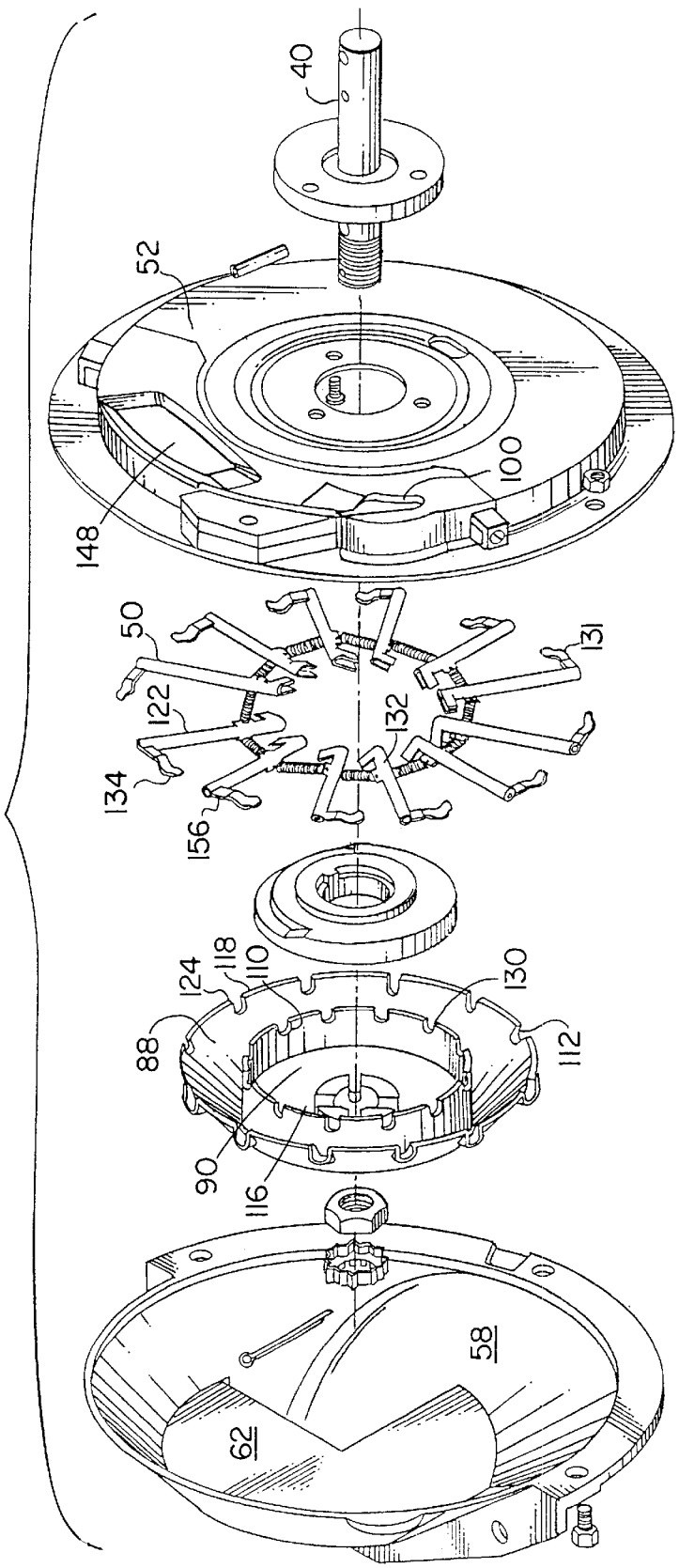
FIG. 3 comprising FIG. 3a and FIG. 3b is an exploded view of the planting mechanism of this planter including the fingers, the backing plate and other essential elements.
Figure 5:
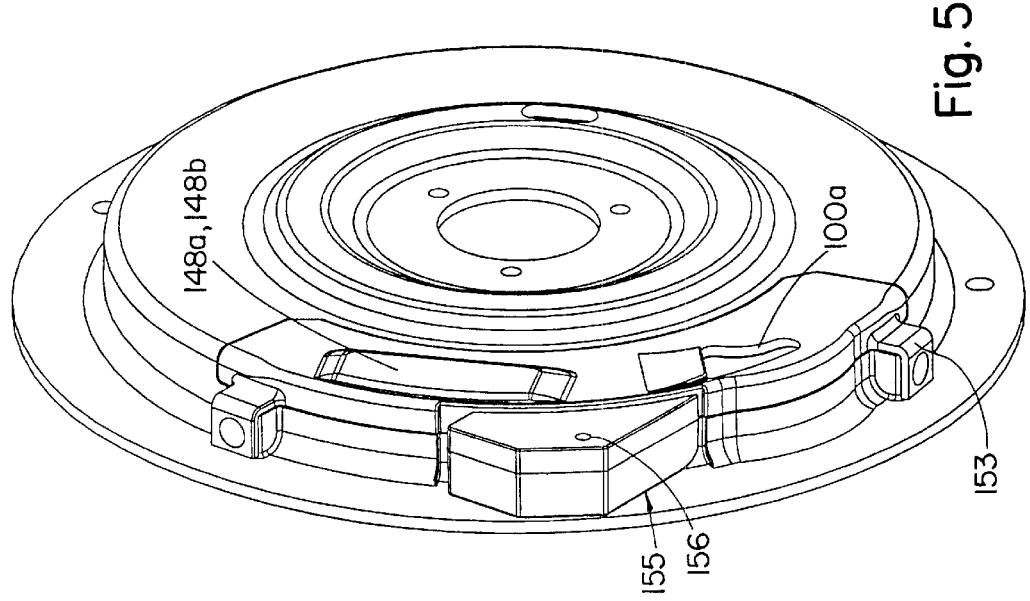
FIG. 5 is a perspective view of the backing plate from the non-working side.
Figure 4:
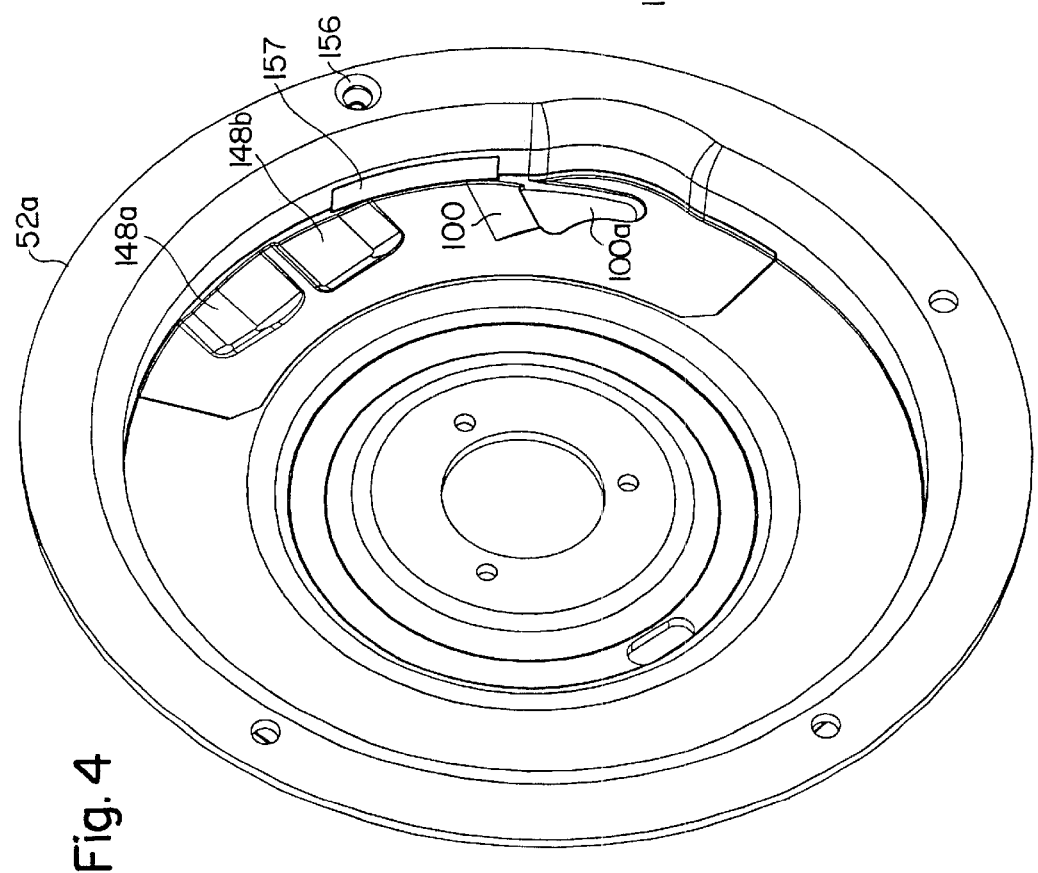
FIG. 4 is a view of the novel backing plate of this invention showing the interior working side of the backing plate wherein the fingers run.

The seed selecting mechanism of the present invention is designed to be used with the planter of the type partially illustrated in FIG. 1. The planter includes a transversely extending frame 10 to which a plurality of planting units may be secured. Each planting unit, there being only one shown in FIG. 1 is indicated generally at 12 and includes upper and lower generally parallel links 14 and 16 respectively secured at their forward ends to the transverse frame 10. The rear ends of the upper and lower link 14 and 16 are pivotally secured to supporting structure 20 in a manner which is not material to the present invention. The supporting structure carries the seed selecting mechanism of the present invention indicated generally at 22 as well has principal seed hopper 24, a double disk opener 26, a runner 28 and a press wheel 30. The structure 20 includes a pair of spaced apart plates not shown, one plate being provided with an aperture which receives the seed selecting mechanism 22. The seed transverse frame 10 is adapted to be raised and lowered by a ground engaging wheel means, not shown, and the down pressure of the openers 26, 28 of the planter unit 12 is adjusted through a spring link.

The seed selecting mechanism is driven by a chain which is mounted with one end over a sprocket mounted on a transversely extending jackshaft carried on the frame 10. The jackshaft may be driven from the ground engaging wheels which support the planter frame or in the alternative it may be driven through hydraulic motor. If the jackshaft is driven from a hydraulic motor it is desirable to provide control means so that the speed of the jackshaft may be proportionally adjusted relative to the ground speed of the planter. Additional drive means in the form of chains and sprockets are provided as necessary.

The seed selecting mechanism 22 has a seed selecting means in the form of plurality of seed selecting fingers indicated generally at 50 which are mounted adjacent a stationary wear plate 52 carried by the main frame. The seed selecting fingers 50 engage seeds in a seed supply area 56 formed in a lower portion of the auxiliary hopper 58 which also acts as a cover for the finger pickup mechanism. The auxiliary hopper 58 receives seeds from the principal seed hopper 24 through tubular means which terminate in the lower portion of the cover 58. The cover 58 has an aperture 62 to receive the seeds from the tube. By having the aperture only in the lower portion 58 the seeds are prevented from contacting an upper surface of the plate 52. However there will always be sufficient supply of seeds in the bottom of the auxiliary hopper 58 to assure that seeds will be selected by the seed selecting fingers provided, however there are seeds in the principal hopper 24. The finger guide 88 is formed of inner and outer disk shaped members 110 and 112 respectively. They may be spot welded together although they may be secured to each other in any suitable fashion. As previously mentioned the holder 88 was provided with opening 90. This opening being formed in both members 110 and 112. The outer disk shape member 112 has an axially spaced inner and outer radial portions 116 and 118 respectively inner connected by conical portions.

Each of the fingers is provided with an elongated cylindrical portion 122 and an outer segment of this portion is rotatively held between the outer annular portion 118 and the wear plate 52. The portion 118 is provided with semi cylindrical recesses or bearing portions 124 which receive the cylindrical portion 122. The semi cylindrical portion 124 is of such a depth that when the elongated cylindrical portion 122 of the finger 50 is disposed within the upper surface of the portion 122 bears against the plate 52. The inner disk shaped member 110 has a planar annular portion which terminates in an outer cylindrical portion. The cylindrical portion is provided with circular notches 130 which receive an inner cylindrical portion 132 of the fingers 50, the inner portion also bearing against a portion of the plate member 52. From the forgoing it can be seen that as the finger guide and holder 88 is caused to rotate by the rotation of the shaft 40, the fingers 50 will be rotatively moved about the wear plate or backing plate as they are held between the bearing surfaces and the plate member.

Each finger is formed with outer seed engaging means 134 and inner cam follower means in addition to the elongated cylindrical portion 122. The finger 50 is held away from the wear plate 52 and disposed during a portion of its rotation about the wear plate 52. During a portion of travel of the finger 50a cam face will act against the face 144 of a cam follower to hold the seed engaging means 134 away from the plate 52.

As the seed engaging means 131 passes through the seed supply, namely that area below the upper level of seed within the auxiliary hopper. The seed engaging portion is held in an open position. As the seed engaging means of the finger passes out of the seed supply the cam follower moves past the terminal end of the cam permitting the biasing or spring means to force the seed engaging means towards the plate 52. The seed disposed between the seed engaging means and the plate will engage by the seed engaging means and slid along the surface of the plate toward the aperture 100 through which the seeds will be forcibly ejected by the biasing means.

Occasionally the seed engaging means 131 may hold two or more seeds against the plate 52 and it has been found necessary to provide means for removing seed doubles from between the seed engaging means 131 and plate 52. To this end the plate 52 is formed with two depressed areas or offset areas, 148a and 148b. Excess seeds over one seed will be dislodged so that only a single seed is carried beyond the final sloping surface to the aperture 100. The seeds that are dislodged fall back into the seed supply 56.

The seed engaging means has a seed engaging surface formed into two cell areas capable of engaging seeds of widely sizes. To this end the seed engaging means 131 is provided with the first seed engaging portion 154 and a second seed engaging portion 156. The relatively small seeds are engaged by the first seed engaging portion 154 within the concave surface formed in the first seed engaging portion and the adjacent surface 160 of the elongated portion 118. The outer and second seed engaging portion 156 is formed with a concave engaging surface also with the inner edge of the concave surface disposed at an angle to the adjacent surface. A plurality of finger forms have been utilized in this type of planter over the years and any form may be used with this invention.

Figure 6:
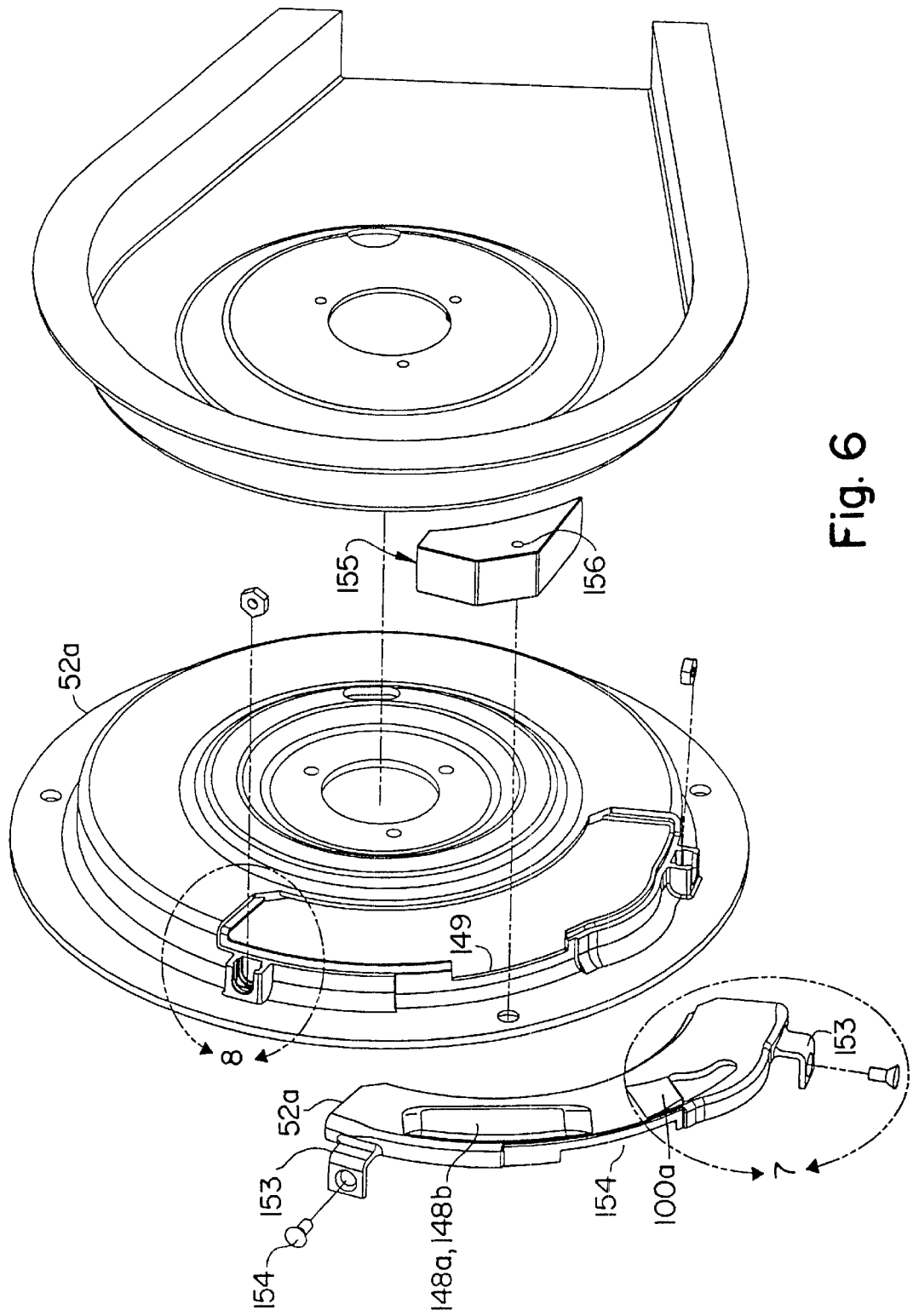
FIG. 6 is a view showing the backing plate with the removable insertable sections and the mounting mechanisms for retaining said sections in said backing plate.

The novel and independent portion of this invention is to replace all of the wear or backing plate 52 normally made of stamp material with a polymer whereby the bearing surface against which the seeds are held by the fingers is perfectly flat and wherein a portion of the polymer backing plate 52 can be removed and replaced with another section having different discharge modulations or depressions. The preferred design of the backing or the wear plate 52 is shown in FIG. 6. This shows the backing plate 52 composed of a very hard polymer, which has been molded to have a very hard flat surface against which the fingers 50 will bear. Shown in FIG. 6, the insertable portion of the backing plate member 52 shown as 52a which is to be inserted into a void by in the molding process in the wear plate 52. This section of wear plate 52a as a section of wear plate 52 or is held in position by flanges 153 and 154. This provides a completely tight backing plate in each section 52a with a predetermined modulation or depressed areas 148 and 148b. The insert can be molded with various assortments of depressions and/or modulations as required by the various seed sizes to ensure release and selection of a single seed as described herein before.

Figure 8:
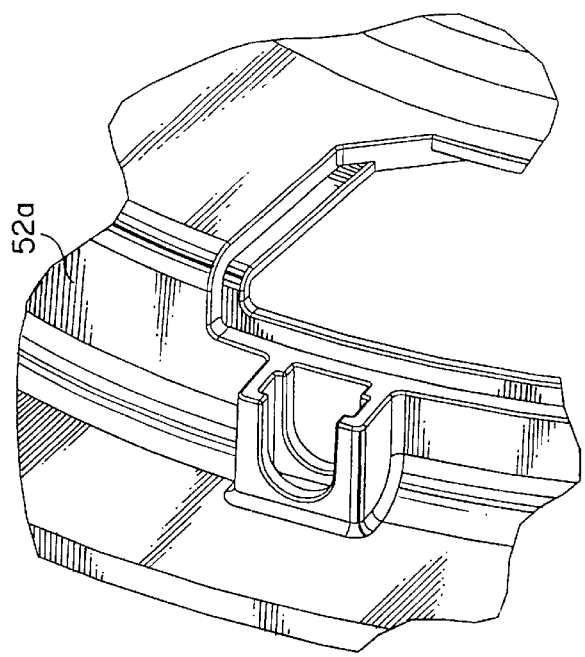
FIG. 8 is a detailed view showing the fastening structure of backing plate.
Figure 7:
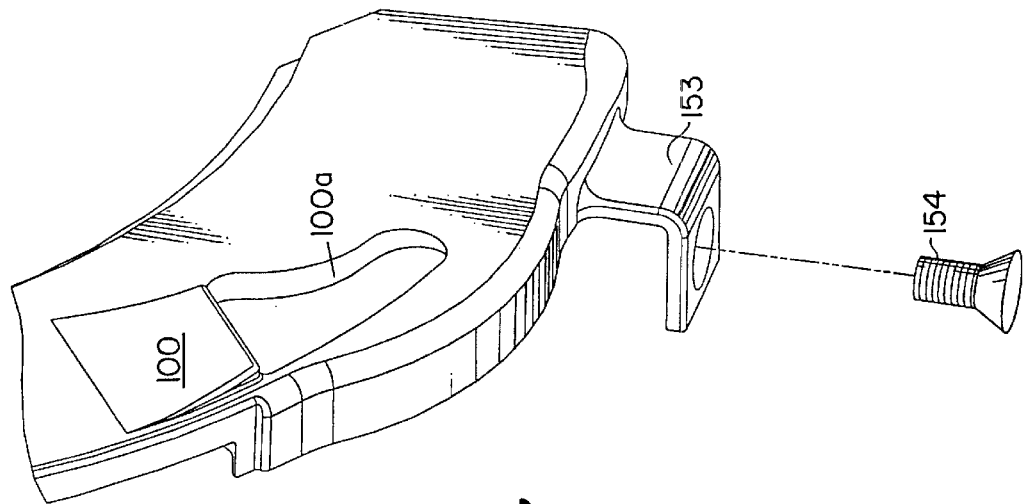
FIG. 7 is a detailed view of the support and fastening structure for the removable insertable backing plate.
Figure 9:
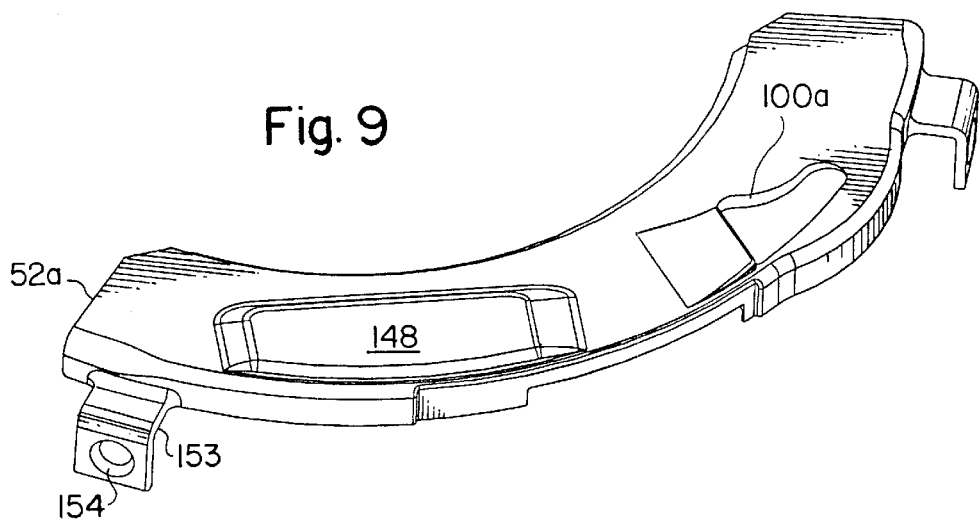
FIG. 9 is a plan view of one the removable insertable of said backing plate.
Figure 10:
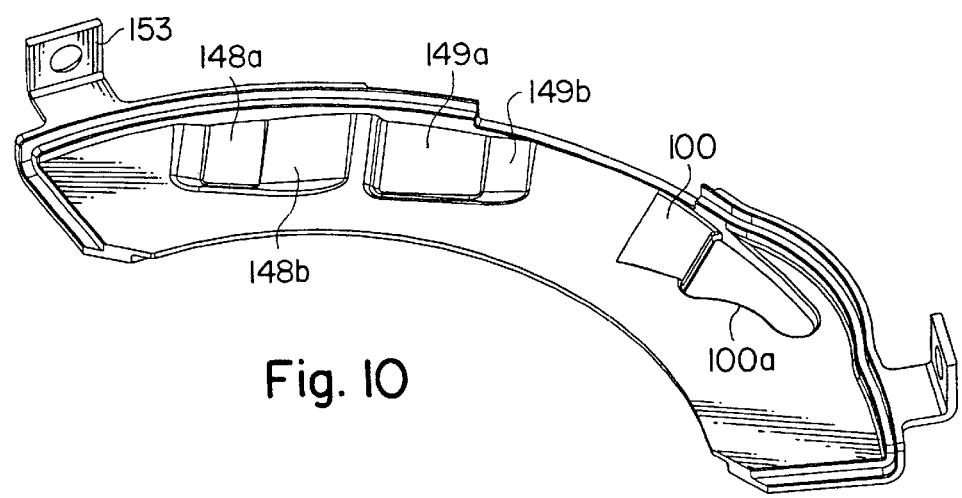
FIG. 10 is the reverse plan view of one of the removable insertable sections of the backing plate.
Figure 11:
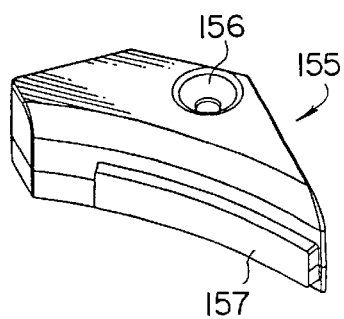
FIG. 11 is a detailed view showing the interior of filler of an auxiliary release means mechanism.
Figure 12:
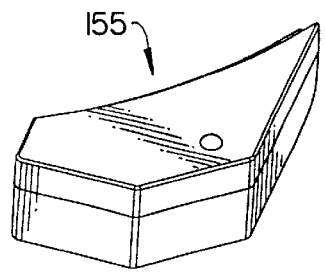
FIG. 12 is a reverse view showing the exterior of filler and auxiliary release means mechanism.

In addition, the insert 52a has a new exit 100a. FIG. 7 shows a detail of the improved exit 100a and further description of the fastening means 153 with the bolt or screw means 154. FIG. 8 shows the fastening means in the portion of the wear plate 52a made of polymer, showing the details of the fastening area as found in the wear plate.

The improved exit 100a has been modified, from the prior art rectangle which was basically the size of the fingers, to a triangular shape. It has been found by experimentation that having an exit with a triangular shape (plan) with the apex of the triangle pointed in the direction of the rotation of the fingers reduces the rejection of seeds from the transport means back into the hopper. It further has been found that specific contour of this triangular shape further improves the rejection rate of seeds after release and after entering the transport section.

This exit is best when contoured with a geometrically circumferentially curved edge and a circumferentially curved surface from the interior radius of the entrance to exterior radius of the exit. Such a configuration has reduced the rejection to an absolute minimum.

There is also a possible auxiliary on the periphery of the backing plate and secured to the axial surface of the backing plate section.

The interior surface of this auxiliary release means may have a brush facing the seed fingers or radial projection to remove seed which may have not been released by the primary release means.

Having described the preferred embodiment other features of the present invention will undoubtedly occur to those first in the art and will numerous modifications and alterations in the embodiments of the invention illustrated. All of which may be achieved without departing from the spirit and scoop of the invention as supplied in the appended claims.

What is claimed is:

1. A planter having a finger pickup type seed metering device, a seed hopper and a seed discharge system:
   a. said seed metering device having an inlet from a seed hopper;
   b. said metering device including a circular seed container connected to said inlet and a plurality of fingers mounted for rotation in said container;
   c. said container having a backing plate made of lubricious material including a release mechanism and an outlet;
   d. said outlet mating with said discharge system;
   e. said fingers picking up and holding individualized seeds against said backing plate during rotation of the fingers to said release mechanism;
   f. said backing plate outlet receiving said seeds from said release mechanism for movement to soil.

2. The invention as set forth in claim 1, wherein said backing plate includes one of a plurality of removable insertable radial sections containing said release means and said outlet means.

3. The invention as set forth in claim 2, wherein said backing plate and said insert are composed of lubricous material.

4. The invention as set forth in claim 2, wherein said backing plate having formed therein axially opposite said fingers an arcuate radial section cut out for receiving one of said removable and insertable sections.

5. The invention as set forth in claim 2, wherein each of said removable and insertable sections includes at least one contour modulation of height and depth.

6. The invention as set forth in claim 5, wherein each of said removable and insertable sections includes an exit.

7. The invention as set forth in claim 6, wherein said exit in said removable insertable section has a triangular shape (plan) with the apex thereof pointed in direction of rotation of fingers.

8. The invention as set forth in claim 7, wherein said exit is contoured with a geometrically circumferentially curved edge and a circumferentially curved surface from the interior radius of the entrance to the exterior radius of the exit.

9. The invention as set forth in claim 5, wherein said contoured modulations are coated with a different wear resistant material than that from which the removable and insertable section is formed.

10. The invention as set forth in claim 9, wherein said different wear resistant material is ceramic.

11. The invention as set forth in claim 10, wherein said exit has a specific contour including a entrance area greater than the width of the fingers and an apex area equal to the width of the fingers.

12. The invention as set forth in claim 2, wherein said backing plate and each of said removable insertable sections has a circumferential flange portion with an axial depth including a radial cut out portion in said axial depth portion.

13. The invention as set forth in claim 12, wherein said axial depth cut out section are radially aligned with said cut out portion of said backing plate opposite said fingers.

14. The invention as set forth in claim 13, wherein one of said removable insertable radial sections is inserted in said axially depth cut out section of said backing plate.

15. The invention as set forth in claim 14, wherein an insert is fastened to remainder of the backing plate.

16. The invention as set forth in claim 14, wherein said removable insertable section is affixed to said backing plate.

* * * * *